(12) United States Patent
Kim

(10) Patent No.: US 12,357,879 B2
(45) Date of Patent: Jul. 15, 2025

(54) STEERING CONTROL DEVICE AND METHOD FOR VEHICLE

(71) Applicant: HL MANDO CORPORATION, Pyeongtaek-Si (KR)

(72) Inventor: Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 755 days.

(21) Appl. No.: 17/715,950

(22) Filed: Apr. 8, 2022

(65) Prior Publication Data

US 2022/0339503 A1 Oct. 27, 2022

(30) Foreign Application Priority Data

Apr. 22, 2021 (KR) .......................... 10-2021-0052629

(51) Int. Cl.
*A63B 24/00* (2006.01)
*A63B 21/00* (2006.01)
(Continued)

(52) U.S. Cl.
CPC ...... *A63B 24/0087* (2013.01); *A63B 21/0054* (2015.10); *A63B 21/0058* (2013.01); *A63B 21/22* (2013.01); *A63B 21/4035* (2015.10); *A63B 21/4049* (2015.10); *A63B 23/12* (2013.01); *A63B 23/1209* (2013.01);
(Continued)

(58) Field of Classification Search
CPC ........... A63B 24/0087; A63B 21/0054; A63B 21/0058; A63B 21/22; A63B 21/4035; A63B 21/4049; A63B 23/12; A63B 23/1209; A63B 24/0062; A63B 2024/0093; A63B 2208/0233; A63B 2220/16; A63B 2220/34; A63B 2220/40; A63B 2220/54; A63B 2220/62; A63B 2220/805; A63B 2220/806; A63B 2230/75; B60W 10/20; B60W 10/26; B60W 40/08; B60W 50/082; B60W 2040/0827; B62D 5/005;
(Continued)

(56) References Cited

U.S. PATENT DOCUMENTS

2013/0190986 A1* 7/2013 Nishimori .............. B62D 6/007
                                                        701/41
2015/0191200 A1* 7/2015 Tsubaki ............... B62D 15/025
                                                        701/42
(Continued)

FOREIGN PATENT DOCUMENTS

DE   10 2009 025 150   12/2010
DE   10 2010 030 308   12/2011
DE   10 2013 203 115   8/2014

OTHER PUBLICATIONS

Office Action dated Dec. 7, 2022 for German Patent Application No. 10 2022 203 887.8 and its English machine translation by Google Translate.

*Primary Examiner* — Phutthiwat Wongwian
*Assistant Examiner* — Susan E Scharpf
(74) *Attorney, Agent, or Firm* — WOMBLE BOND DICKINSON (US) LLP

(57) ABSTRACT

The disclosure relates to a steering control device and method for a vehicle and may provide a vehicle steering control device and method capable of doing exercise using the steering wheel of the vehicle to easily do exercise inside the vehicle while driving and preventing drowsy driving.

14 Claims, 7 Drawing Sheets

(51) Int. Cl.

| | |
|---|---|
| *A63B 21/005* | (2006.01) |
| *A63B 21/22* | (2006.01) |
| *A63B 23/12* | (2006.01) |
| *B60W 10/20* | (2006.01) |
| *B60W 10/26* | (2006.01) |
| *B60W 40/08* | (2012.01) |
| *B60W 50/08* | (2020.01) |
| *B62D 5/00* | (2006.01) |
| *B62D 5/04* | (2006.01) |
| *H02J 7/14* | (2006.01) |

(52) U.S. Cl.
CPC ......... *A63B 24/0062* (2013.01); *B60W 10/20* (2013.01); *B60W 10/26* (2013.01); *B60W 40/08* (2013.01); *B60W 50/082* (2013.01); *B62D 5/005* (2013.01); *B62D 5/0457* (2013.01); *B62D 5/046* (2013.01); *H02J 7/1415* (2013.01); *A63B 2024/0093* (2013.01); *A63B 2208/0233* (2013.01); *A63B 2220/16* (2013.01); *A63B 2220/34* (2013.01); *A63B 2220/40* (2013.01); *A63B 2220/54* (2013.01); *A63B 2220/62* (2013.01); *A63B 2220/805* (2013.01); *A63B 2220/806* (2013.01); *A63B 2230/75* (2013.01); *B60W 2040/0827* (2013.01); *B60Y 2400/307* (2013.01)

(58) Field of Classification Search
CPC ..... B62D 5/0457; B62D 5/046; H02J 7/1415; B60Y 2400/307
See application file for complete search history.

(56) References Cited

U.S. PATENT DOCUMENTS

2019/0233004 A1* 8/2019 Kodera .................... B62D 3/12
2020/0269913 A1* 8/2020 Fujimoto ............. B62D 5/0484

* cited by examiner

STEERING CONTROL DEVICE AND METHOD FOR VEHICLE

CROSS-REFERENCE TO RELATED APPLICATION

This application claims priority from Korean Patent Application No. 10-2021-0052629, filed on Apr. 22, 2021, which is hereby incorporated by reference for all purposes as if fully set forth herein.

BACKGROUND

Field

The present embodiments relate to a steering control device and method for a vehicle.

Description of Related Art

Vehicle steering system refers to a system in which the driver of a vehicle may change the steering angle of the wheels of a vehicle based on the steering force (or rotational force) applied to the steering wheel. The electric power steering system (EPS) has been applied to vehicles to reduce the steering force of the steering wheel to ensure the stability of the steering state. There has been ongoing vigorous research on steer-by-wire-based vehicle steering devices.

Further, modern people seldom spare time for workout in their busy lifestyle and thus suffer from shortage of exercise and health risks. People who spend more time in their vehicle are put in poor physical condition due to shortage of exercise and experience frequent fatigue and drowsy driving, leading to an accident.

Therefore, a need arises for technology for allowing people to do exercise in their vehicle to prevent drowsy driving and possible accidents.

BRIEF SUMMARY

In the foregoing background, the present embodiments may provide a vehicle steering control device and method for exercise in a vehicle using a vehicle steering device.

In an aspect, the present embodiments may provide a steering control device of a vehicle, comprising an exercise mode determining unit determining to execute an exercise mode of a reaction force motor based on exercise request information input by a user if at least one of vehicle driving information about the vehicle or user information meets a preset condition, a load generation unit generating a load by the reaction force motor by controlling upper switching elements or lower switching elements for each phase of an inverter to simultaneously perform a switching operation depending on whether the exercise mode is executed, and a state output unit calculating and outputting exercise state information from a start time of the exercise mode execution.

In another aspect, the present embodiments may provide a steering control method of a vehicle, comprising an exercise mode determination step determining to execute an exercise mode of a reaction force motor based on exercise request information input by a user if at least one of vehicle driving information about the vehicle or user information meets a preset condition, a load generation step generating a load by the reaction force motor by controlling upper switching elements or lower switching elements for each phase of an inverter to simultaneously perform a switching operation depending on whether the exercise mode is executed, and a state output step calculating and outputting exercise state information from a start time of the exercise mode execution.

The present embodiments may provide a vehicle steering control device and method for exercise in a vehicle using a vehicle steering device.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
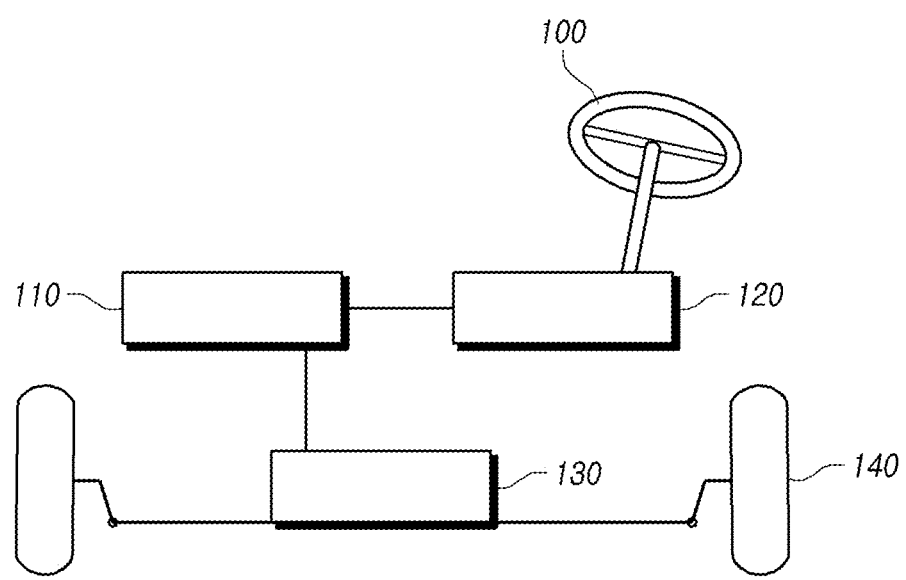
FIG. 1 is a view illustrating an example of an overall configuration of a steer-by-wire-based vehicle steering system according to an embodiment.

The disclosure relates to a vehicle steering control device and method.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a view illustrating an example of an overall configuration of a steer-by-wire-based vehicle steering system according to an embodiment.

Referring to FIG. 1, according to an embodiment, a steer-by-wire-based vehicle steering system may include a steering wheel 100, a steering column module (SCM) 120, a steering rack module (SRM) 130, a control module 110, and a wheel 140.

The steering wheel 100 may be operated by the user's manipulation. For example, the steering wheel 100 may be rotated by the user's manipulation and, based thereupon, may determine or change the direction of the vehicle.

The steering column module 120 may be connected with the steering wheel 100. The steering column module 120 may include a steering shaft, a reaction force motor, and each sensor. For example, the steering shaft may be connected with the steering wheel 100. If the steering wheel 100 rotates, the steering shaft may rotate in response to the rotating steering wheel 100. The reaction force motor may be connected with the steering shaft. The reaction force motor may rotate in a direction opposite to the rotation direction of the steering wheel 100 to provide a steering reaction force to the steering wheel 100 so that the user may have an appropriate steering feeling. Each sensor may include at least one of a steering angle sensor, a torque sensor, or a steering angle speed sensor. However, the type of the sensor is not limited thereto as long as it may measure the states of various components included in the steering column module 120. For example, the steering angle sensor may measure the steering angle, which is the rotation angle of the steering wheel 100. The torque sensor may measure the torque generated at the steering shaft as the steering wheel 100 rotates. The steering angle speed sensor may measure the steering angle speed, which is the rotation angular speed of the steering wheel 100. The steering column module 120 has the same meaning as a steering feedback actuator (SFA) and may herein be used interchangeably with each other.

The steering rack module 130 may be mechanically separated from the steering column module 120. The steering rack module 130 may include a steering motor, a pinion, a rack, and each sensor. For example, the steering motor may be driven by a driving current. The steering motor may generate a driving torque corresponding to the driving current and may provide a steering force to the steering wheel 100 based on the generated driving torque. The pinion may be connected with the steering motor. The pinion may rotate based on the driving torque generated by the steering motor. The rack may be connected with the pinion. The rack may perform a linear motion based on the rotation of the pinion. In other words, the pinion and the rack may provide a steering force to the steering wheel 100 based on the driving torque of the steering motor to change the direction of the steering wheel 100. Each sensor may include at least one of a rack position sensor, a rack displacement sensor, a pinion angle sensor, or a pinion angular speed sensor. However, the type of the sensor is not limited thereto as long as it may measure the states of various components included in the steering rack module 130. For example, the rack position sensor may measure the position of the rack, and the rack displacement sensor may measure the displacement of the rack. The pinion angle sensor may measure the angle of the pinion, which is the rotation angle of the pinion. The pinion angular speed sensor may measure the angular speed of the pinion, which is the rotation angular speed of the pinion. The steering rack module 130 has the same meaning as a road wheel actuator (RWA) and may herein be used interchangeably with each other.

The control module 110 may control the operation of the steering column module 120 and the steering rack module 130. For example, the control module 110 may receive information from each of the components included in the steering column module 120 and the steering rack module 130, generate a control signal using the received information, and control the operation of each component included in the steering column module 120 and the steering rack module 130 based on the generated control signal. As another example, the control module 110 may control the operation of each sensor disposed to the vehicle. The control module 110 may control the operation of each sensor disposed to the vehicle, generate each control signal based on each piece of information therefrom, and control the operation of each component included in the steering column module 120 and the steering rack module 130 using each generated control signal. The control module 110 may mean a steering control device. The control module 110 is described below in detail with reference to FIGS. 3 to 7.

The wheel 140 may be connected with the steering rack module 130. For example, the steering motor may be connected with the rack bar to transfer the rotational force of the steering motor to the rack bar while converting the rotational force into an axial linear movement force. The linear movement force of the rack may be transferred to the wheel 140 connected through a tie rod and a knuckle arm.

Figure 2:
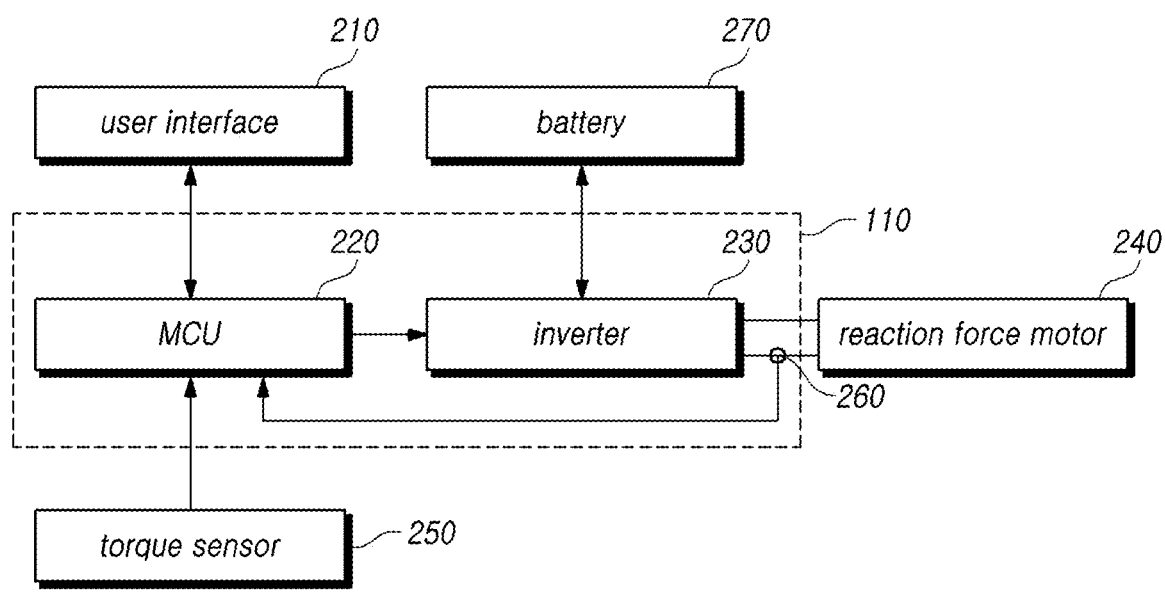
FIG. 2 is a view illustrating a configuration of a vehicle steering system according to an embodiment.

FIG. 2 is a view illustrating a configuration of a vehicle steering system according to an embodiment.

Referring to FIG. 2, according to an embodiment, a vehicle steering system may include an electronic control device 110 including a micro control unit (MCU) 220 and an inverter 230, a torque sensor 250, a current sensor 260, a reaction force motor 240, and a user interface 210. According to an embodiment, the steering control device of the vehicle may implemented as the electronic control device, such as an electronic control unit (ECU). For example, upon detecting the user's steering torque by the torque sensor 250 when executing a normal mode, the MCU 220 of the steering control device may generate a pulse-width modulation (PWM) pulse and control the inverter 230, driving the reaction force motor 240. In this case, the current flowing through the reaction force motor 240 may be fed back through the current sensor 260 to the MCU 220 and be used to calculate the duty ratio of the PWM pulse. As another example, upon executing an exercise mode, the MCU 220 of the steering control device may control the inverter 230 to restrict the reaction force motor 240 and adjust the magnitude of the restricting force using the duty ratio of the PWM pulse.

The user interface 210 may output the information generated from the vehicle steering control device through an output module, e.g., a display and may receive the exercise mode from the user through a mounted button and transmit the exercise mode to the vehicle steering control device. For example, the user interface 210 may have a touch display panel disposed inside the vehicle to perform input and output.

Further, upon executing the exercise mode, the steering control device may generate alternating current (AC) power by the restricting force of the reaction force motor 240, convert the AC power into direct current (DC) power, and charge the battery 270 with the DC power.

Figure 3:
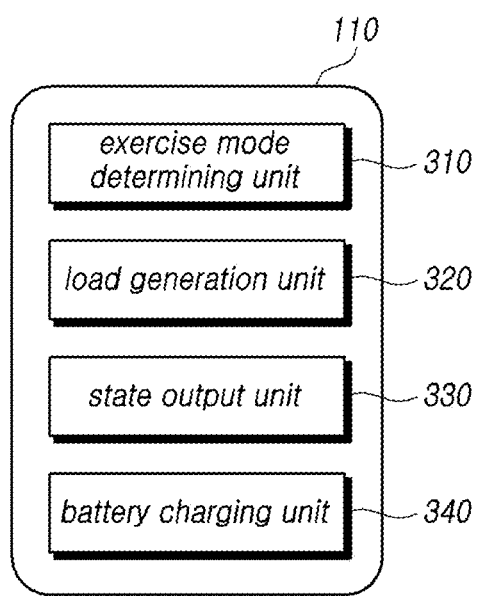
FIG. 3 is a view illustrating a configuration of a vehicle steering control device according to an embodiment.

FIG. 3 is a view illustrating a configuration of a vehicle steering control device according to an embodiment.

Referring to FIG. 3, according to an embodiment, the vehicle steering control device 110 may include an exercise mode determining unit 310 that determining to execute the exercise mode of the reaction force motor 240 based on exercise request information input by the user if at least one of the vehicle driving information about the vehicle or user information meets a preset condition, a load generation unit 320 that generates a load by the reaction force motor 240 by controlling to allow upper switching elements or lower switching elements for each phase of the inverter 230 to simultaneously perform switching operation depending on whether the exercise mode is executed, and a state output unit 330 that calculates and outputs exercise state information from the start time of executing the exercise mode.

If at least one of the vehicle driving information about the vehicle obtained from a plurality of sensors mounted to the vehicle or user information meets the preset condition, the exercise mode determining unit 310 may determine to execute the exercise mode of the reaction force motor 240 based on the exercise request information input by the user. For example, the exercise mode determining unit 310 may preset, as the condition for executing the exercise mode, when the state of the vehicle obtained from the vehicle driving information is a parked or stopped state or when the user's state obtained from the user information is a drowsy driving state or a long-term driving state. Accordingly, if the vehicle meets the preset exercise mode execution condition, the exercise mode determining unit 310 may determine to execute the exercise mode of the reaction force motor 240 depending on whether exercise request information is input by the user.

As another example, if it is determined to execute the exercise mode, the exercise mode determining unit 310 may determine to change at least one of the exercise part, exercise direction, or exercise angle based on the step of executing the exercise mode selected by the user and execute the exercise mode. Specifically, the step of executing the exercise mode may select a range in which exercise using the steering wheel 100 is possible according to the user's intent, such as arm or shoulder exercise, right or left turning exercise, or ±120-degree turning exercise.

If the execution of the exercise mode is determined, the load generation unit 320 may generate a load by the reaction force motor 240 by controlling to allow the upper switching elements or lower switching elements for each phase of the inverter 230 to simultaneously perform switching operation. For example, the load generation unit 320 may generate a load by controlling the switching operation based on a torque sensor signal of the reaction force motor. Specifically, the load generation unit 320 may control the switching operation to turn on all of either the upper switching elements or lower switching elements for each phase of the inverter 230 to short the motor coil of each phase of the reaction force motor 240, generating a load.

However, when generating and providing a load according to the execution of the exercise mode, the load generation unit 320 may operate only the steering feedback actuator while stopping operation of the load wheel actuator including, e.g., the steering motor and the rack. For example, the load generation unit 320 may stop operating the steering motor even when the reaction force motor is operated, when executing the exercise mode. As a specific example, if the execution of the exercise mode is determined, the load generation unit 320 may stop the operation of the steering motor separately from the operation of the reaction force motor, fixing the wheel of the vehicle connected with the steering motor. Accordingly, as the wheel of the vehicle is fixed, it may be possible to prevent wear to a mechanical component or tire that may occur when the exercise mode is executed. As another example, the load generation unit 320 may adjust the magnitude of the load by changing the duty ratio of determining the switching operation and adjust the strength of exercise depending on the magnitude of the load. Specifically, the load generation unit 320 may change the duty ratio through adjustment of the on or off time of the switching operation and adjust the load, with the magnitude of the load adjusted from the optimal load to no load. Further, the load generation unit 320 may adjust the strength of exercise to high, medium, or low depending on the magnitude of the generated load.

The state output unit 330 may calculate and output the exercise state information from the start time of executing the exercise mode. For example, the state output unit 330 may calculate and output, in real-time, the amount of charge of the battery due to exercise, calorie consumption, and exercise time from the start time of executing the exercise mode so as to identify the user's amount of exercise according to the execution of the exercise mode.

The battery charging unit 340 may charge the battery 270 using the restricting force of the reaction force motor 240 generated as the steering wheel 100 of the vehicle is rotated when the exercise mode is executed. For example, if the restricting force of the reaction force motor 240 is generated so that the steering wheel 100 of the vehicle is rotated while the steering shaft is stopped from rotation when the exercise mode is executed, the battery charging unit 340 may convert the AC power generated due to exercise into DC power and charge the battery 270 with the DC power. In other words, when the exercise mode is executed, the battery charging unit 340 may short the switching element to cut off the current supply to generate the restricting force of the reaction force motor 240. Thus, the reaction force motor 240 may operate as a power generator, and the current generated from the reaction force motor 240 may charge the battery 270.

The exercise mode determining unit 310 may drive a program implemented by pre-stored data as one of exercise modes. The state output unit 330 may output an exercise target value, exercise status, or calorie consumption through the user interface 210 according to the implemented program.

Figure 4:
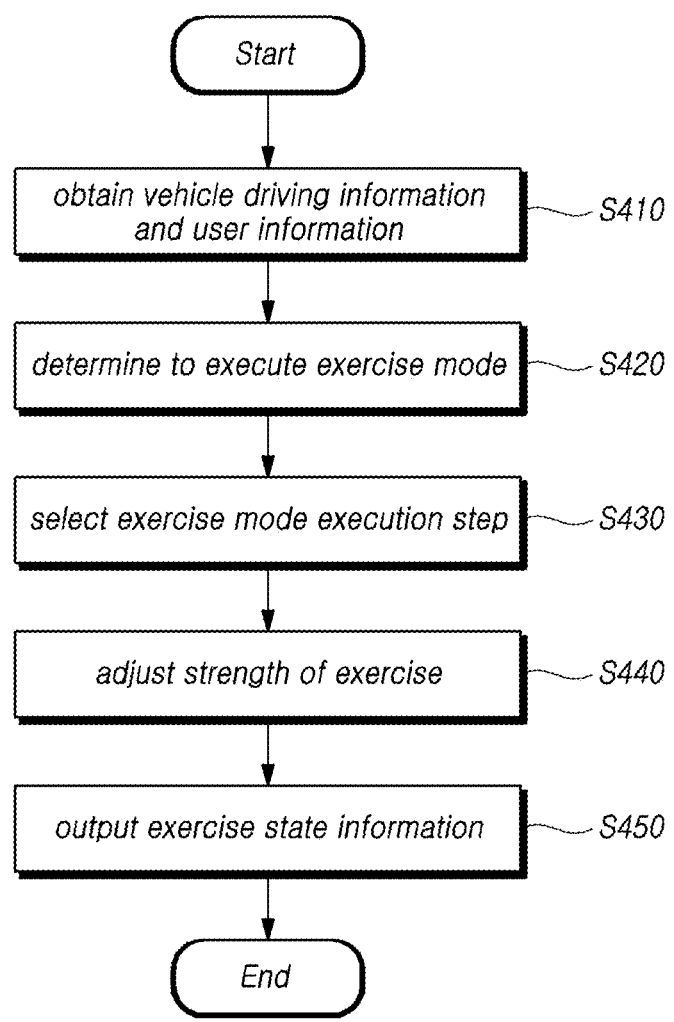
FIG. 4 is a flowchart illustrating operations of a vehicle steering control device according to an embodiment.

FIG. 4 is a flowchart illustrating operations of a vehicle steering control device according to an embodiment.

Described with reference to FIG. 4 is an example of a control operation when a vehicle steering control device executes the exercise mode according to an embodiment. As an example, the exercise mode determining unit 310 may obtain vehicle driving information and user information and determine whether the condition is an exercise mode-executable condition (S410). As an example, the exercise mode determining unit 310 may determine whether the state of the vehicle is a parked state or stopped state from the vehicle driving information. The vehicle driving information may be information used to control the vehicle while driving the vehicle and may be information obtained through various units included in the vehicle. Specifically, the vehicle driving information may include navigation information, vehicle control state information, or vehicle position information. For example, the exercise mode determining unit 310 may determine whether the state of the vehicle is the parked state or stopped state using, e.g., the navigation information or vehicle position information per time period. The exercise mode determining unit 310 may determine the parked state of the vehicle using, e.g., the vehicle's gyro sensor or accelerometer. The exercise mode determining unit 310 may determine the parked state of the vehicle using the vehicle's position information per time period. The exercise mode determining unit 310 may preset a threshold speed at which the vehicle may be determined to be in the stopped state and, if the rotational speed of the wheel of the vehicle is less than a threshold speed, determine that the vehicle is in the stopped state. Accordingly, if the state of the vehicle corresponds to the parked state or stopped state, the exercise mode determining unit 310 may determine that the preset condition is met.

As another example, the exercise mode determining unit 310 may determine whether the user's state is a drowsy driving state or a long-term driving state from the user information. The user information may be information used to monitor the user's state while driving the vehicle and be information obtained through an infrared camera and a sensor mounted in the vehicle. Specifically, the user information may include the user's motion information, face information, eye and mouth shape information, body temperature, pulse, and brain wave or driving time information. For example, the exercise mode determining unit 310 may determine the user's drowsy driving state by recognizing whether there is the user's precursor of drowsing, using the user's motion information, face information, and eye and mouth shape information. The exercise mode determining unit 310 may determine the long-term driving state using the driving time information about the vehicle. Accordingly, if the user's state corresponds to the drowsy driving state or long-term driving state, the exercise mode determining unit 310 may determine that the preset condition is met.

The exercise mode determining unit 310 may determine to execute the exercise mode based on exercise request information input by the user (S420). If at least one of the vehicle driving information about the vehicle or the user information meets the preset condition, the exercise mode determining unit 310 may determine to execute the exercise mode according to the user's input of the exercise request information. For example, the exercise mode determining unit 310 may receive the exercise request information to switch into the exercise mode of the vehicle using at least one of a button, touch, or speech recognition from the user. However, the exercise mode determining unit 310 may first determine whether the exercise mode executable condition is met to determine to execute the exercise mode by the input exercise request information. For example, if the state of the vehicle corresponds to the parked state or stopped state, the exercise request information may be an executable control signal.

The load generation unit 320 may select the step of exercise mode execution (S430). As an example, the load generation unit 320 may determine an operation range of the steering wheel to change at least one of the exercise part, exercise direction, or exercise angle based on the step of the exercise mode execution selected by the user and execute the exercise mode. For example, the load generation unit 320 may determine the step of the exercise mode execution in which the operation range of the steering wheel has been changed to be suitable for one-arm exercise, two-arm exercise, or shoulder exercise depending on the exercise part. The load generation unit 320 may determine the step of exercise mode execution in which the rotation direction of the steering wheel has been changed to a counterclockwise (CCW) direction, clockwise (CW) direction, or the two directions. The load generation unit 320 may set a rotation angle of the steering wheel and determine the step of exercise mode execution in which the exercise angle has been changed to allow exercise within the preset range. As a specific example, the user may select the exercise mode execution step and determine to enable two-arm exercise, bi-directional exercise, or ±120-degree exercise.

The load generation unit 320 may adjust the magnitude of the load, adjusting the exercise strength (S440). As an example, the load generation unit 320 may generate a load in a manner of turning on all of either the upper switching elements or lower switching elements for each phase of the inverter to short the motor coil of each phase of the reaction force motor. As the motor, any multi-phase motor may be adopted. For example, if the motor is a five-phase motor, a load may be generated by turning on all of either the upper switching elements or the lower switching elements of the inverter corresponding to the five phase. As another example, the load generation unit 320 may adjust the strength of exercise in a manner of adjusting the magnitude of the load by changing the duty ratio for determining the switching operation. For example, to maximize the average magnitude of the generated load, the load generation unit 320 may increase the duty ratio through pulse width modulation and turn on or off the switch depending on the adjusted duty ratio.

As another example, the load generation unit 320 may turn on the switching elements corresponding to some phases, generating a load. For example, the load generation unit 320 may turn on only the U and V phases among the U, V, and W phases of a three-phase motor, generating a load.

The state output unit 330 may calculate and output the exercise state information from the start time of executing the exercise mode (S450). As an example, the state output unit 330 may automatically calculate the amount of exercise according to the speed of exercise from the start time of executing the exercise mode and automatically calculate and output the calorie due to the result of exercise. Specifically, the state output unit 330 may display fat burning according to the strength of exercise and the amount of exercise according to the strength of exercise, such as cardiopulmonary function enhancement, and automatically calculate and output the amount of exercise according male and female age groups and calculate the calorie consumption according to the exercise speed. The state output unit 330 may perform provision of Bluetooth communication, customized healthcare prescription (exercise recommendation or calorie calculation), proposal of weight training and provision of effects and output them.

As another example, the state output unit 330 may receive electric energy generated according to the execution of the exercise mode, charge the battery, and output the amount of charge. Specifically, the state output unit 330 may output the amount of power of the charged battery and a preset allowable amount of charge for the battery. For example, if the strength of exercise is adjusted to high or low, the state output unit 330 may calculate and output the amount of exercise and the amount of charge based on the amount of power pre-measured according to the strength of exercise.

As another example, the state output unit 330 may output an icon configured to be able to receive, e.g., whether the exercise mode is executed, the step of exercise mode execution, or the strength of exercise from the user.

Figure 5:
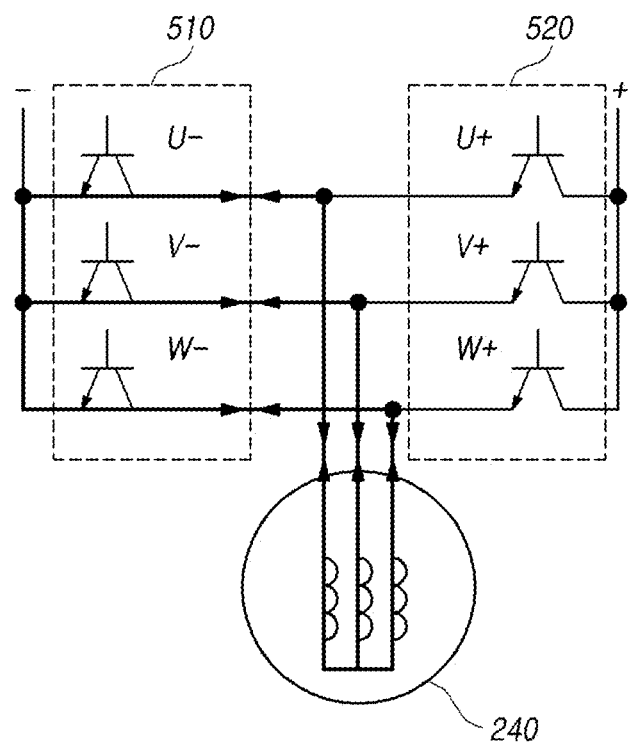
FIG. 5 is a view illustrating a switching operation of a load generation unit according to an embodiment.

FIG. 5 is a view illustrating a switching operation of a load generation unit according to an embodiment.

Described with FIG. 5 is an example of generating a load by controlling the switching operation of the inverter by the load generation unit 320 of the vehicle steering control device according to an embodiment. As an example, if there is no steering signal due to a torque sensor signal, the load generation unit 320 may generate a load in a manner of turning on all of either the upper switching elements or lower switching elements for each phase of the inverter to short the motor coil of each phase of the reaction force motor. The switching elements of the inverter may include use upper switching elements 520 connected to the positive voltage-side circuit unit and lower switching elements 510 connected to the negative voltage-side circuit unit. Two switching elements may be connected in series to each phase (U phase, V phase, and W phase) and may be connected to the motor coil of each phase of the motor.

For example, the load generation unit 320 may turn on all of the three lower switching elements 510 connected to the negative voltage side of each phase and turn off all of the three upper switching elements 520 connected to the positive voltage side of each phase, shortening the motor coil of each phase of the motor. Accordingly, as a restricting force of the motor is generated, a braking force may be generated by the motor. The load generation unit 320 may turn on all of the three upper switching elements 520 and turn off all of the three lower switching elements 510, shorting the motor coil of each phase of the motor. In contrast, if the load generation unit 320 turns off all of the upper switching elements 520 and the lower switching elements 510, the motor may generate no restricting force.

As another example, the load generation unit 320 may adjust the magnitude of the load by changing the duty ratio of determining the switching element. For example, the adjustment of the magnitude of the load by the load generation unit 320 may be performed by current control by PWM driving. Specifically, the load generation unit 320 may simultaneously turn off the three lower switching elements 510 connected to the negative voltage side in the on-operation state and, in this case, it may be performed by controlling the pulse width that gives an on-operation time. Accordingly, the load generation unit 320 may generate the braking torque having a desired magnitude by controlling the pulse width, adjusting the magnitude of the load.

Figure 6:
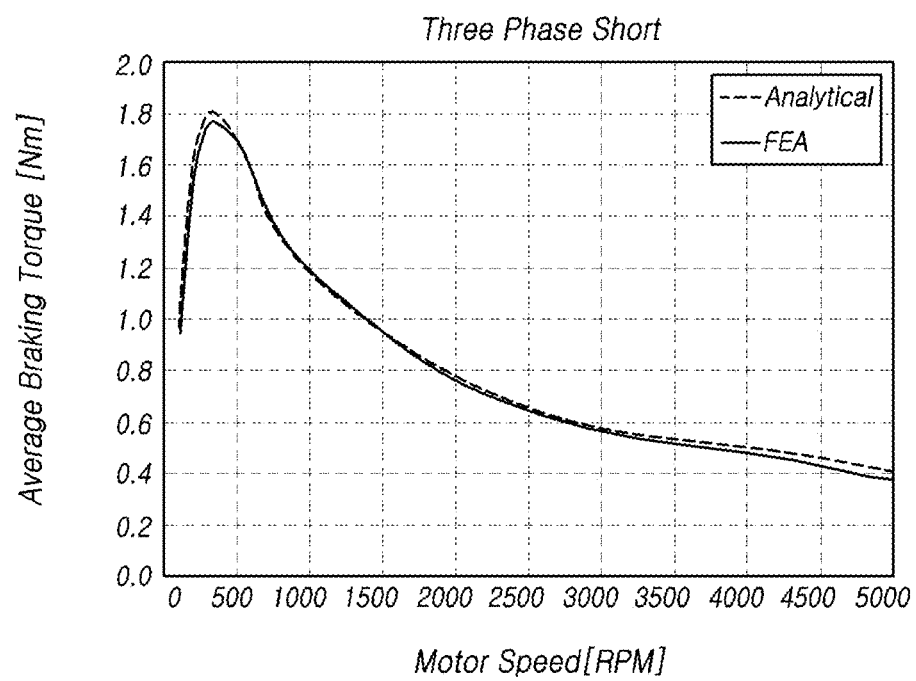
FIG. 6 is a view illustrating an example of generating a load by a load generation unit according to an embodiment.

FIG. 6 is a view illustrating an example of generating a load by a load generation unit according to an embodiment.

Described with FIG. 6 is an example of generating a load by the load generation unit 320 of the vehicle steering control device according to an embodiment. In FIG. 6, Analytical may denote the theoretical value, and FEA may denote the finite element analysis value that is a result of a braking torque generation simulation. As an example, if there is no steering signal input due to a torque sensor signal, the load generation unit 320 may short each phase motor coil of the reaction force motor by the switching element of the inverter, generating a braking torque of the reaction force motor. The load generation unit 320 may adjust the generated braking torque of the reaction force motor to the system braking torque using the reduction ratio of the reducer, generating a desired load. As a specific example, the load generation unit 320 may generate the braking torque (retention function) up to 1.8 Nm for the reaction force motor. The load generation unit 320 may generate the system braking torque up to 44 Nm using a reducer having a reduction ratio of 22:1. However, the magnitude of the generated braking torque, the magnitude of the system braking torque, and the reduction ratio are merely an example, and are not limited thereto.

As described above, the steering control device according to an embodiment may generate a load through braking torque, minimizing the power consumed due to the load of the SbW system steering wheel.

The computer system, such as the vehicle steering control device, may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

A vehicle steering control method that may be performed by the vehicle steering control device 110 described above in connection with FIGS. 1 to 6 is described below.

Figure 7:
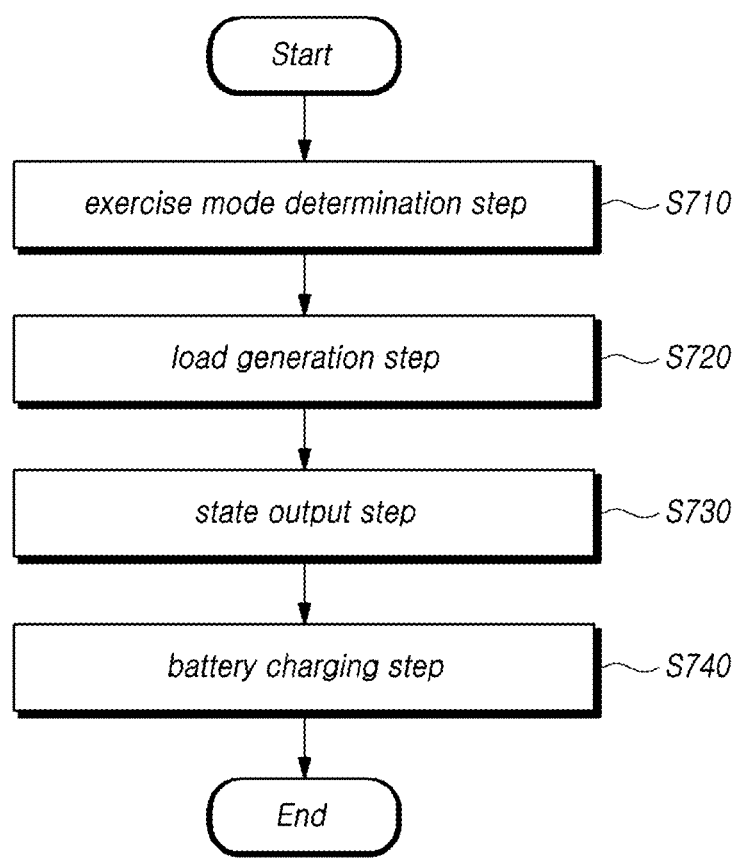
FIG. 7 is a flowchart illustrating a vehicle steering control method according to an embodiment.

FIG. 7 is a flowchart illustrating a vehicle steering control method according to an embodiment.

Referring to FIG. 7, the vehicle steering control method of the disclosure may include an exercise mode determination step (S710). As an example, if at least one of the vehicle driving information about the vehicle or user information meets the preset condition, the vehicle steering control device may determine to execute the exercise mode of the reaction force motor based on the exercise request information input by the user. For example, the vehicle steering control device may preset, as the condition for executing the exercise mode, when the state of the vehicle obtained from the vehicle driving information is a parked or stopped state or when the user's state obtained from the user information is a drowsy driving state or a long-term driving state. Accordingly, if the vehicle meets the preset exercise mode execution condition, the vehicle steering control device may determine to execute the exercise mode of the reaction force motor depending on whether exercise request information is input by the user.

As another example, the vehicle steering control device may determine to change at least one of the exercise part, exercise direction, or exercise angle based on the step of the exercise mode execution selected by the user and execute the exercise mode. As an example, the step of executing the exercise mode may select a range in which exercise using the steering wheel is possible according to the user's intent, such as armor shoulder exercise, right or left turning exercise, or ±120-degree turning exercise.

The vehicle steering control method may include a load generation step (S720). As an example, the vehicle steering control device may generate a load by the reaction force motor by controlling to allow the upper switching elements or lower switching elements for each phase of the inverter to simultaneously perform switching operation. For example, the vehicle steering control device may control the switching operation to turn on all of either the upper switching elements or lower switching elements for each phase of the inverter to short the motor coil of each phase of the reaction force motor, generating a load.

As another example, the vehicle steering control device may adjust the magnitude of the load by changing the duty ratio of determining the switching operation and adjust the strength of exercise depending on the adjusted magnitude of the load. For example, the vehicle steering control device may adjust the strength of exercise to high, medium, or low depending on the magnitude of the generated load.

The vehicle steering control method may include a state output step (S730). As an example, the vehicle steering control device may calculate and output the exercise state information from the start time of executing the exercise mode. For example, the vehicle steering control device may calculate and output, in real-time, the amount of charge of the battery due to exercise, calorie consumption, and exercise time from the start time of executing the exercise mode so as to identify the user's amount of exercise according to the execution of the exercise mode.

The vehicle steering control method may include a battery charging step (S740). As an example, the vehicle steering control device may charge the battery using the restricting force of the reaction force motor, which is generated as the steering wheel of the vehicle is rotated, when the exercise mode is executed. For example, when the exercise mode is executed, the vehicle steering control device may short the switching element to cut off the current supply to generate the restricting force of the reaction force motor. Thus, the reaction force motor may operate as a power generator, and the current generated from the reaction force motor may charge the battery.

As described above, according to the disclosure, it is possible to provide a vehicle steering control device and method for exercise in a vehicle using a vehicle steering device. In particular, it is possible to provide a vehicle steering control device and method capable of doing exercise using the steering wheel of the vehicle to easily do exercise while driving and preventing drowsy driving.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering control device of a vehicle, comprising:
an exercise mode determining unit determining to execute an exercise mode of a reaction force motor based on exercise request information input by a user if at least one of vehicle driving information about the vehicle or user information meets a preset condition;
a load generation unit generating a load by the reaction force motor by controlling upper switching elements or lower switching elements for each phase of an inverter to simultaneously perform a switching operation depending on whether the exercise mode is executed; and
a state output unit calculating and outputting exercise state information from a start time of the exercise mode execution.

2. The steering control device of claim 1, wherein the exercise mode determining unit determines that the condition is met if it is determined that a state of the vehicle obtained from the vehicle driving information is a parked state or a stopped state or the user's state obtained from the user information is a drowsy driving state or a long-term driving state.

3. The steering control device of claim 1, wherein the exercise mode determining unit determines to change at least one of an exercise part, an exercise direction, or an exercise angle based on a step of executing the exercise mode selected by the user and to execute the exercise mode.

4. The steering control device of claim 1, wherein the load generation unit adjusts a magnitude of the load by changing a duty ratio of determining the switching operation and adjusts a strength of exercise depending on the magnitude of the load.

5. The steering control device of claim 1, wherein the load generation unit generates the load by controlling the switching operation based on a torque sensor signal of the reaction force motor, and wherein the switching operation includes turning on all of either the upper switching elements or the lower switching elements for each phase of the inverter to short a motor coil of each phase of the reaction force motor.

6. The steering control device of claim 1, further comprising a battery charging unit charging a battery using a restricting force of the reaction force motor generated as a steering wheel of the vehicle is rotated when the exercise mode is executed.

7. The steering control device of claim 6, wherein the state output unit calculates, in real-time, and outputs an exercise time, calorie consumption, and an amount of charge of the battery from the start time of executing the exercise mode.

8. A steering control method of a vehicle, comprising:
an exercise mode determination step determining to execute an exercise mode of a reaction force motor based on exercise request information input by a user if at least one of vehicle driving information about the vehicle or user information meets a preset condition;
a load generation step generating a load by the reaction force motor by controlling upper switching elements or lower switching elements for each phase of an inverter to simultaneously perform a switching operation depending on whether the exercise mode is executed; and
a state output step calculating and outputting exercise state information from a start time of the exercise mode execution.

9. The steering control method of claim 8, wherein the exercise mode determination step determines that the condition is met if it is determined that a state of the vehicle obtained from the vehicle driving information is a parked state or a stopped state or the user's state obtained from the user information is a drowsy driving state or a long-term driving state.

10. The steering control method of claim 8, wherein the exercise mode determination step determines to change at least one of an exercise part, an exercise direction, or an exercise angle based on a step of executing the exercise mode selected by the user and to execute the exercise mode.

11. The steering control method of claim 8, wherein the load generation step adjusts a magnitude of the load by changing a duty ratio of determining the switching operation and adjusts a strength of exercise depending on the magnitude of the load.

12. The steering control method of claim 8, wherein the load generation step generates the load by controlling the switching operation based on a torque sensor signal of the reaction force motor, and wherein the switching operation includes turning on all of either the upper switching elements or the lower switching elements for each phase of the inverter to short a motor coil of each phase of the reaction force motor.

13. The steering control method of claim 8, further comprising a battery charging step charging a battery using a restricting force of the reaction force motor generated as a steering wheel of the vehicle is rotated when the exercise mode is executed.

14. The steering control method of claim 13, wherein the state output step calculates, in real-time, and outputs an exercise time, calorie consumption, and an amount of charge of the battery from the start time of executing the exercise mode.

\* \* \* \* \*